United States Patent Office 2,694,057
Patented Nov. 9, 1954

2,694,057

FORMATION OF GUM SALTS BY CATION EXCHANGE

Dolor N. Adams, Lakewood, Ohio, assignor to Harris-Seybold Company, Cleveland, Ohio, a corporation of Delaware No Drawing. Application September 5, 1951, Serial No. 245,259

4 Claims. (Cl. 260—209)

Although the chemical composition of naturally occurring exudate gums has not been very fully investigated, there is evidence that these in general are compounds involving calcium and magnesium, that is they are alkaline earth metal salts of rather strong gum acids. The gums in such form have certain limiting and undesirable properties which go with the alkaline earth type of salt. Compounds or salts of alkali metals would afford much superior utilities in various lines of usage. To some extent gum arabic has been treated by hydrochloric acid and dialysis to produce a product of arabic acid which retains some impurities in the form of acid-degradation products and dialysis-concentrate materials, and such product has then in turn been reacted with a desired alkali metal hydroxide. Thus, by two operations it has been possible to some extent to prepare such products as sodium arabate, potassium arabate, and the like. A more direct and less expensive way of preparing such compounds is however highly important if commercial output and more highly pure products are to be attained. In accordance with the present invention, it now becomes possible however to prepare alkali metal compounds of gum acids in a simple direct procedure of operation, and with attainment of products which are free from the contaminations carried over by hydrochloric acid decomposition and dialysis. Other objects and advantages of the invention will appear from the following description.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

As raw materials for the present invention, water-soluble naturally occurring exudate gums, or water-soluble constituents of naturally occurring gums, which are salts of strong organic acids, are applicable. Such are, for instance, gum arabic, mesquite gum, tahla gum, brea gum, ghatti gum, etc., and the soluble portions of partially soluble gum such as gum tragacanth, gum karaya, etc. The gum employed as raw material is dissolved in water. Whether there be a true solution or a dispersion sufficient for the processing, is not particularly material, these being equivalent for the purpose. Concentration of solution may be guided somewhat by its solubility and by the desired concentration of ultimate solution if the end product is to be used directly in the solution form, and by considerations of viscosity as effecting throughput, etc. Thus, concentrations of range 5 to 30 per cent are applicable in general. Foreign and undissolved material, as dirt, etc., may be filtered out. Then the solution is reacted with a cation type exchange complex in the presence of the base desired in the end product, particularly a hydroxide of the group potassium, lithium, ammonium and sodium. The exchange complex is a cationic carboxyl type synthetic resin complex of high molecular composition of a non-metallic element of the fourth periodic group. Whereas exchange resins in extensive use for some purposes heretofore have been sulphonic acid synthetic resins, such as phenol-formaldehyde-sulphonic acid complex, the cation-exchange complex here employed involves carboxylic rather than sulphonic composition.

Among such resins commercially available are for instance the exchange complex "IRC-50."

The exchange resin is first treated with an acid giving a soluble product in cleaning the complex, as for instance 4 per cent hydrochloric acid, or other acids such as sulfamic. Then, after a water wash, ammonium hydroxide or hydroxide of the alkali metal as afore-stated is applied to the resin; and the gum solution is reacted with the resin. Preferably, the resin may be in a bed or column, and the liquid applied may be supplied from below. This allows for swelling and readjustment of volume. Desirably, rather strong solutions of the ammonium hydroxide or other hydroxide of the alkali metal character will be employed, as for instance a range of 4 to 12 per cent.

After several contactings or passes of the gum solution, the rate of reaction falls off. The resin is then washed free of gum by hot water, as for instance by back washing, then hydrochloric acid, as for instance 4 per cent solution, and particularly effectively in amount 110 per cent of the stoichiometric requirement against the calcium and magnesium picked up by the resin, is applied. The resin is water-washed, and the ammonium or other hydroxide as afore-indicated is applied, and more gum solution is supplied to the resin.

As an example:

With a carboxylic resin, known in the trade as IRC-50, in a container of column form, 4 per cent hydrochloric acid is passed through, then wash water is applied, followed by a 12 per cent solution of ammonium hydroxide, and then a 20 per cent solution of gum arabic is passed through the resin. Whereas the raw material gum had a composition involving calcium and magnesium bases in salt form with arabic acid, the product obtained is ammonium arabate of particularly high purity.

In the same manner, operation employing potassium hydroxide solution yields potassium arabate, and operation with sodium hydroxide solution with the resin yields sodium arabate.

The chemical composition of other analogous natural exudate gums is not as fully known as that of gum arabic, but such gums as afore-stated are similarly salts of alkaline earth metals and high molecular acids of composition not in each instance known, but the evidence is sufficiently clear for their acid character, and by the present process such crude gums can be directly converted into compounds of the group consisting of the alkali metals potassium, lithium and sodium and the analogous ammonium, and these are for conciseness referred to as "alkali metals."

Other modes of applying the principle of the invention may be employed, change being made as regards the details described, provided the features stated in any of the following claims or the equivalent of such be employed.

I therefore particularly point out and distinctly claim as my invention:

1. A process of forming a salt of a natural exudate gum, comprising applying ammonium hydroxide to a previously acid-treated carboxylic type synthetic resin cation exchange complex of high molecular composition of a non-metallic element of the fourth periodic group, and breaking up gum arabic and forming ammonium arabate from the gum acid radical by reacting the gum arabic in water with such carboxylic type cation exchange complex.

2. A process of forming a salt of a natural exudate gum, comprising applying a solution of a hydroxide of the group consisting of potassium, lithium, ammonium and sodium to a previously acid-treated carboxylic type synthetic resin cation exchange complex of high molecular composition of a non-metallic element of the fourth periodic group, and breaking up gum arabic and forming a different arabate with the gum acid radical by reacting the gum arabic in water with such carboxylic type cation exchange complex.

3. A process of forming a salt of a natural exudate gum, comprising applying ammonium hydroxide to a previously acid-treated carboxylic type synthetic resin cation exchange complex of high molecular composition of a non-metallic element of the fourth periodic group, and breaking up a naturally occurring exudate gum containing sap constituents and forming a different organic compound with the gum acid radical by reacting the naturally occurring exudate gum in water with such carboxylic type cation exchange complex.

4. A process of forming a salt of a natural exudate gum, comprising applying a solution of a hydroxide of the group consisting of potassium, lithium, ammonium and sodium to a previously acid-treated carboxylic type synthetic resin cation exchange complex of high molecular composition of a non-metallic element of the fourth periodic group, and breaking up a naturally occurring exudate gum containing sap constituents and forming a different organic compound with the gum acid radical by reacting the naturally occurring exudate gum in water with such carboxylic type cation exchange complex.

References Cited in the file of this patent

UNITED STATES PATENTS

| Number | Name | Date |
| --- | --- | --- |
| 2,543,699 | Le Gloahec | Feb. 27, 1951 |

OTHER REFERENCES

Ion Exchange—Chemical Engineering—July 1947, pp. 123–130.

Rohm and Haas Co., Resinous Products Div., pamphlet entitled "Amberlite IRC-50"—p. 4, April 1948.

Ion Exchange—Nachod (1949), pp. 61, 62.

Ion Exchange Resins—Kunin et al. (1950), p. 31.

Ion Exchange Resins—Kunin et al. (1950), pp. 32, 134, 137.